United States Patent
Hassanzadeh Nazarabadi et al.

(10) Patent No.: US 12,058,271 B2
(45) Date of Patent: Aug. 6, 2024

(54) DISTRIBUTED HASH TABLE BASED BLOCKCHAIN ARCHITECTURE FOR RESOURCE CONSTRAINED ENVIRONMENTS

(71) Applicant: KOC UNIVERSITESI, Istanbul (TR)

(72) Inventors: Yahya Hassanzadeh Nazarabadi, Istanbul (TR); Oznur Ozkasap, Istanbul (TR); Alptekin Kupcu, Istanbul (TR)

(73) Assignee: KOC UNIVERSITESI, Istanbul (TR)

( * ) Notice: Subject to any disclaimer, the term of this patent is extended or adjusted under 35 U.S.C. 154(b) by 306 days.

(21) Appl. No.: 17/598,316

(22) PCT Filed: Mar. 27, 2019

(86) PCT No.: PCT/TR2019/050199
§ 371 (c)(1),
(2) Date: Sep. 27, 2021

(87) PCT Pub. No.: WO2020/197514
PCT Pub. Date: Oct. 1, 2020

(65) Prior Publication Data
US 2022/0191037 A1    Jun. 16, 2022

(51) Int. Cl.
*G06Q 20/22* (2012.01)
*G06Q 20/40* (2012.01)
(Continued)

(52) U.S. Cl.
CPC ......... *H04L 9/3239* (2013.01); *G06Q 20/223* (2013.01); *G06Q 20/401* (2013.01);
(Continued)

(58) Field of Classification Search
CPC ..... H04L 9/3239; H04L 9/50; H04L 2209/56; G06Q 20/223; G06Q 20/401; G06Q 2220/00; G06Q 20/065; G06Q 20/389
See application file for complete search history.

(56) References Cited

U.S. PATENT DOCUMENTS

2016/0358135 A1    12/2016  Liao et al.
2018/0276668 A1*    9/2018  Li .................... H04L 9/3239
(Continued)

FOREIGN PATENT DOCUMENTS

KR    20180079847 A    7/2018
WO    2017145017 A1    8/2017
(Continued)

OTHER PUBLICATIONS

"Blockchain Storage Load Balancing Among DHT Clustered Nodes", Ryosuke Abe, Feb. 6, 2019, Keio University (Year: 2019).*
(Continued)

*Primary Examiner* — Duan Zhang
(74) *Attorney, Agent, or Firm* — Bayramoglu Law Offices LLC

(57) ABSTRACT

A blockchain architecture operating over a skip graph-based P2P overlay to improve a communication and storage efficiency, a convergence to centralization, and consistency problems of existing blockchain solutions is provided. The blockchain architecture provides addressable peers, blocks, and transactions within a network; making the addressable peers, the blocks and transactions efficiently accessible in an on-demand manner by peers using a skip graph lookup operation where no peer is required to store an entire blockchain, and stores a replicated subset of the blocks and transactions and answers queries of other peer on the blocks and transactions. The blockchain architecture discloses a fair blockchain with a uniform chance for participating peers to be involved in a consensus protocol regardless of an influ- (Continued)

| | |
|---|---|
| View Layer: | Randomized-Bootstrapping<br>Time Complexity: $O(n)$<br>Communication Complexity: $O(\log n)$ |
| Storage Layer: | Randomized-Replication<br>Storage Complexity: $O(\frac{b}{n})$ |
| Consensus Layer: | Proof-of-Validation (PoV)<br>Time Complexity: $O(1)$<br>Communication Complexity: $O(\log n)$ |
| Network Layer: | Using Skip Graph DHT<br>Communication Complexity: $O(\log n)$ | ence of the participating peers in a system with an improved consistency governing a deterministic fork-resolving policy.

14 Claims, 4 Drawing Sheets

(51) Int. Cl.
    *H04L 9/32*     (2006.01)
    *H04L 9/00*     (2022.01)
(52) U.S. Cl.
    CPC ............ *G06Q 2220/00* (2013.01); *H04L 9/50* (2022.05); *H04L 2209/56* (2013.01)

(56) References Cited

U.S. PATENT DOCUMENTS

| | | | | |
|---|---|---|---|---|
| 2018/0285869 | A1* | 10/2018 | Li | H04L 9/0637 |
| 2020/0153615 | A1* | 5/2020 | Chen | G06Q 20/065 |

FOREIGN PATENT DOCUMENTS

| | | | | | |
|---|---|---|---|---|---|
| WO | WO-2018217804 | A1 * | 11/2018 | ......... | H04L 12/1886 |
| WO | WO-2019032891 | A1 * | 2/2019 | ............ | H04L 9/3239 |
| WO | WO-2019092545 | A1 * | 5/2019 | ............. | G06F 16/27 |

OTHER PUBLICATIONS

"Skip+: A Self-Stabilizing Skip Graph", Journal of the ACM, vol. 61, No. 6, Article 36, Nov. 2014 (Year: 2014).*
"ALGORAND", Jing Chen, May 26, 2017, <https://arxiv.org/abs/1607.01341> (Year: 2017).*
"On Federated and Proof of Validation Based Consensus Algorithms in Blockchain", K.N. Ambili et al.2017 IOP Conf. Ser.: Master. Sci. Eng. 225 012198 (Year: 2017).*
Sheng Wang, et al., ForkBase: An Efficient Storage Engine for Blockchain and Forkable Applications, 2018.
Yahya Hassanzadeh-Nazarabadi, et al., Interlaced:Fully decentralized churn stabilization for skip graph-based DHTs, 2019.
Ryosuke Abe, Blockchain Storage Load Balancing Among DHT Clustered Nodes, Master Thesis, Academic Year, 2018, 66 pages.
Matteo Bernardini, et al., Blockchains Meet Distributed Hash Tables: Decoupling Validation from State Storage (Extended Abstract), 2019, pp. 1-13.
Eleftherios Kokoris-Kogias, et al., OmniLedger: A Secure, Scale-Out, Decentralized Ledger via Sharding.
Kyle Croman, et al., On Scaling Decentralized Blockchains (A Position Paper), Lecture Notes in Computer Science, 2016, vol. 9604.
Mahdi Zamani, et al., RapidChain: Scaling Blockchain via Full Sharding, pp. 1-38.

* cited by examiner

| | |
|---|---|
| *View Layer:* | Randomized-Bootstrapping<br>Time Complexity: $O(n)$<br>Communication Complexity: $O(\log n)$ |
| *Storage Layer:* | Randomized-Replication<br>Storage Complexity: $O(\frac{b}{n})$ |
| *Consensus Layer:* | Proof-of-Validation (PoV)<br>Time Complexity: $O(1)$<br>Communication Complexity: $O(\log n)$ |
| *Network Layer:* | Using Skip Graph DHT<br>Communication Complexity: $O(\log n)$ |

FIG. 1

DISTRIBUTED HASH TABLE BASED BLOCKCHAIN ARCHITECTURE FOR RESOURCE CONSTRAINED ENVIRONMENTS

CROSS REFERENCE TO THE RELATED APPLICATIONS

This application is the national stage entry of International Application No. PCT/TR2019/050199, filed on Mar. 27, 2019, the entire contents of which are incorporated herein by reference.

TECHNICAL FIELD

The invention presented hereby generally concerns append-only distributed database in the form of blockchain, specifically utilized in a vast variety of applications including the cryptocurrency and Internet of Things (IoT). Disclosed invention more specifically falls within the technical areas of blockchain architectures aiming to provide addressable blocks and transactions, in turn enabling increasingly efficient accessibility thereof as well as fairness concerning all participating peers having uniform chance of involvement in consensus, fork-resolving strategies and security against availability/integrity threats.

BACKGROUND

Blockchain refers to an append-only distributed database that provides a partial ordering of blocks among a set of trust-less peers, where each block consists of a set of transactions. In a blockchain, the blocks are connected to each other via immutable links from each block to its predecessor, thus forming a chain. Peers are able to read the blocks from the blockchain and write to it solely by appending new blocks to the tail of the chain. Because of defining a partial ordering of blocks without the need of a global clock, providing a tamper-proof architecture, establishing trust over a trust-less system of independent peers and decentralization, the blockchain systems are employed in many decentralized applications including the crypto-currencies, Internet-of-Things, digital rights management, big data, search engines, fair data exchange, supply chain management and namespace management. However, state of blockchain technology in the art suffer from communication and storage-wise inscalability.

Publication document with number US 2018276668 discloses a consensus verification method implementable by a first blockchain node in a consensus network: Receiving a transaction request from a client, and performing a first security verification on the transaction request; in response to determining that the transaction request passes the first security verification, storing the transaction request, and broadcasting the transaction request to each of second blockchain nodes in the consensus network, causing the each second blockchain node to store the transaction request in response to the second blockchain node determining that the transaction request passes a second security verification; performing pre-processing on at least one stored transaction request in response to determining that a preset condition is satisfied, to obtain and store a pre-processed block; and broadcasting the obtained pre-processed block to the second blockchain nodes, causing the second blockchain nodes to perform consensus verification on the obtained pre-processed block.

Document published with WO 2017145017 relates to blockchain technologies such as the Bitcoin ledger, and for the control and performance of secure, efficient exchanges conducted via the blockchain. It comprises tokenisation techniques and methods for embedding metadata in a blockchain transaction. It provides a computer implemented method for performing a transfer, the method comprising scanning entries in a distributed hash table (DHT) distributed across a first network, the DHT comprising a plurality of entries, each entry comprising an invitation to perform an exchange and a link to a transaction on a peer-to-peer (P2P) distributed ledger distributed across a second network, each invitation including metadata comprising an indication of entities to be exchanged and one or more conditions for the exchange; determining a match between a first set of metadata in a first invitation of a first entry from a first user and a second set of metadata in a second invitation of a second entry from a second user.

The considerations regarding blockchain is scalability in means of communication and storage, fairness and consistency that require to be addressed for improvement. It is important to point out that scalability problems persist on all layers of the blockchain protocol stack. At the network layer, all existing blockchains operate on unstructured overlays. Such overlays have no deterministic, well-defined and efficient lookup mechanism to retrieve the address of peers, content of the blocks and new transactions. Rather, the knowledge of a peer (i.e. other peers, blocks and transactions) is gained by the epidemic message dissemination from other peers (e.g. broadcasting in the case of Bitcoin) with the communication complexity of $O(n)$ to disseminate a new block or transaction with n as number of participating peers.

Most successful approach in the art for overcoming problems of performance and scalability is sharding, where blockchain system is split into multiple sub-groups of peers and each group operates in parallel on an independent version of the ledger. Despite its apparent advantage of increasing the speed of the system on processing the transactions in parallel, existing sharding-based blockchains show $O(n)$ communication complexity for processing a single transaction, as well as the best case $O(b/\log n)$ memory-time complexity at the storage and view layers of the system. Kokoris-Kogias et al. in their study titled "Omniledger: A secure, scale-out, decentralized ledger via sharding" put forth a teaching that increases the scalability of blockchain systems as their OmniLedger's throughput scales linearly in the number of active validators, supporting Visa-level workloads and beyond, while confirming typical transactions in under two seconds. It ensures security and correctness by using a bias-resistant public-randomness protocol for choosing large, statistically representative shards that process transactions, and by introducing a crossshard commit protocol that atomically handles transactions affecting multiple shards. Another study titled "RapidChain: Scaling Blockchain via Full Sharding" by Zamani et al. propose t sharding-based public blockchain protocol that is resilient to Byzantine faults from up to a one-third fraction of its participants, and achieves complete sharding of the communication, computation, and storage overhead of processing transactions without assuming any trusted setup. RapidChain employs an optimal intra-committee consensus algorithm that can achieve very high throughputs via block pipelining, a novel gossiping protocol for large blocks, and a provably-secure reconfiguration mechanism to ensure robustness. Using an efficient cross-shard transaction verification technique, our protocol avoids gossiping transactions to the entire network.

SUMMARY

Primary object of the disclosed invention is to present a system of append-only distributed database.

Another object of the disclosed invention is to present a system of blockchain suitable for use in cryptocurrencies and Internet of Things (IoT).

Another object of the disclosed invention is to present a system of blockchain comprising an architecture operating over distributed hash tables (DHTs).

Another object of the disclosed invention is to present a Skip Graph style distributed hash table based blockchain architecture enabling each block and transaction to be replicated within said distributed hash table of peers, and to be retrieved on an on-demand fashion.

Yet another object of the disclosed invention is to present a Skip Graph style distributed hash table based blockchain architecture that ensures communication and storage efficiency through obviating the need for peers to retrieve-and-keep the entire blockchain.

In proposed invention, primary focus of which is append-only database of blockchain, efficient communication among the participating peers is ensured in that said invention operates on top of a Skip Graph, which is a distributed hash table (DHT) based overlay. Each participating peer, transaction and block in the disclosed invention is represented with a Skip Graph node. Having based on such an architecture, every peer, transaction and block is efficiently retrievable with the communication complexity of $O(\log n)$ in a fully decentralized manner.

To establish an efficient storage policy as a main objective of the disclosed invention of blockchain architecture, invention enables the peers to access the transactions and blocks on an on-demand basis using the efficient retrievability intrinsic to the Skip Graph architecture, as opposed to requiring them to store the entire blockchain locally. Each peer is responsible for holding a subset of uniformly chosen transactions and blocks, and responding to the other peers' search queries on those transactions and blocks. Disclosed invention provides the replication of blocks and transactions over the peers of the system for improved availability.

To provide a fully decentralized block generation decision making, in the disclosed invention, the validation of each block is designated to a uniformly chosen subset of the peers. The validating peers are chosen uniquely for each block based on its hash value, and are contacted efficiently using the structured Skip Graph overlay. Working in this fashion, disclosed invention enables improved decentralization of the block generation decision making and deters the centralization monarchy, which is a typically understood disadvantage of the solutions existing in the art. Disclosed invention also preserves the integrity and consistency of the blockchain in the presence of colluding adversarial peers as well as selfish miners, as no peer can contribute to the decision making of two consecutive blocks generation.

To improve the consistency of the blockchain, disclosed invention governs a deterministic rule on resolving of the forks. The fork resolving approach of the present invention deterministically identifies one branch of each fork as the extension of the main chain that should be followed by all the participating peers. This mechanism allows a block to be evaluated and finalized in a deterministic manner as the main chain's block once it is appended to the chain, which is in contrast to the existing solutions that require appending several more subsequent blocks to a new block for that block to be considered as constituting a block of the main chain.

BRIEF DESCRIPTION OF THE DRAWINGS

Accompanying figures are given solely for the purpose of exemplifying a skip graph style distributed hash table (DHT) based blockchain architecture, whose advantages over prior art were outlined above and will be explained in brief hereinafter.

The figures are not meant to delimit the scope of protection as identified in the claims nor should they be referred to alone in an effort to interpret the scope identified in said claims without recourse to the technical disclosure in the description of the present invention.

FIG. 1 demonstrates the protocol stack and the contributions to each layer of the blockchain architecture according to the disclosed invention.

DETAILED DESCRIPTION OF THE EMBODIMENTS

Figure 2:
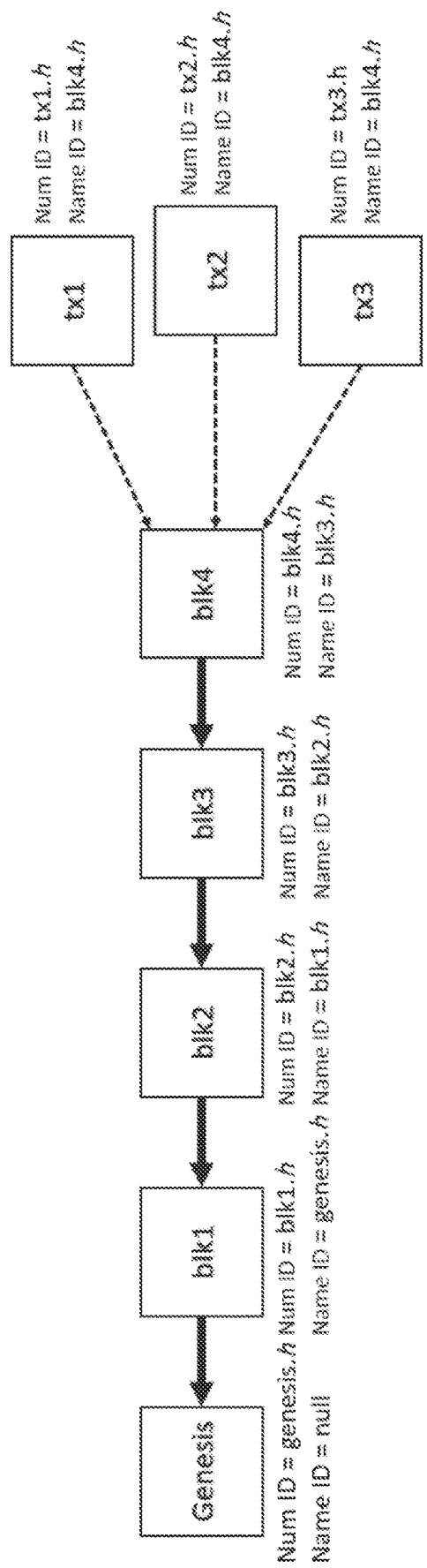
FIG. 2 demonstrates the name ID and numerical ID regulations in the blockchain architecture according to the disclosed invention.

The present invention discloses a highly scalable, efficient with regards to communication and storage, consistent and fully decentralized blockchain architecture marked with uniform block generation decision making operating on top of a Skip Graph based structured peer-to-peer (P2P) overlay. Disclosed invention is further fair compared to the technique in the art in the sense that each of the participating peers in the system has a uniform chance of being involved in the consensus regardless of its influence e.g. processing power, available bandwidth, stakes value. Having n number of peers and b number of blocks in the system, compared to the solutions existing in the art that require storage and communication complexity of $O(n)$ and $O(b)$ respectively, disclosed invention results in a requirement of $O(b/n)$ storage on each peer, and incurs the communication complexity of $O(\log n)$ on generating a new block. These asymptotic operational complexities make the architecture of the system in the disclosed invention highly suitable for resource-limited environments.

Architecture and system proposed in the disclosed invention is an application layer protocol that is executed independently by each participating peer. In disclosed invention, peers, as well as transactions and blocks, are indexed as Skip Graph nodes. Each peer invokes the insertion algorithm of Skip Graph using its on identifiers and IP address and joins the system. As a result of joining the Skip Graph overlay, each peer knows a few other peers, which enables it to efficiently search for any other peer of the system with the communication complexity of $O(\log n)$. Upon joining the Skip Graph overlay, the peer creates its view of the blockchain using the randomized bootstrapping feature.

In the disclosed invention, a transaction represents a state transition of the assets of a peer, which is denoted by the owner peer of that transaction. For example, in the cryptocurrency applications, the asset of a peer is its monetary wealth, and a transaction models a monetary remittance which represents the state transition of the monetary wealth of the owner affected by the remittance. The owner peer casts the state transition into a transaction, computes the identifiers of validators, searches for the validations over Skip Graph overlay, and asks them to validate its transaction. In order to be validated, each transaction needs to be signed by a system-wide constant number of validators, where their identifiers are chosen randomly for each transaction to ensure security.

Once the transaction gets validated, the owner inserts it as a node into the Skip Graph overlay, making it searchable and accessible by any other peer. Insertion of the transaction is done by done by invoking the insertion protocol of Skip Graph using the transaction's identifier but the (IP) address of the owner peer itself. The Skip Graph peers route the messages on behalf of the transactions they hold. This feature enables peers in the disclosed invention to search and find the new transactions. Upon finding new validated transactions, each peer is able to cast them into blocks, go through the validation procedure (similar to the transactions' case), and insert the validated block into the Skip Graph overlay. Each transaction's owner then removes its transaction node from the overlay once it is successfully included in a validated block (for the sake of efficiency). The idea of representing each transaction and block by a Skip Graph node results in any search for the peer or the transactions and blocks that it holds to be routed to the peer's IP address, rendering them accessible by every other peer in a fully decentralized manner. Hence, in LightChain's Skip Graph overlay, there are three types of nodes: peers, transactions, and blocks. In the other words, the Skip Graph overlay acts as a distributed database of the transactions and blocks that are owned by peers, which enables each peer to efficiently search for any transaction or block with the communication complexity of O(log n). The previous relationship of blocks that are stored in a distributed manner on distinct peers defines a blockchain. By making the blocks and transactions efficiently retrievable by search, the participating peers are not required to keep or download the entire ledger. In LightChain, each block or transaction is replicated by its owner and validators to support availability, accessibility, and fault tolerance.

As an incentive mechanism, system in the disclosed invention rewards the peers' contribution on maintaining the connectivity of the system, providing validation service, and generating blocks. Moreover, disclosed architecture encourages honest peers to audit other peers, by rewarding the detection and report of adversarial acts. Malicious behavior is penalized by the system upon detection, and the adversarial peers are blacklisted and gradually isolated from the system. Unless stated otherwise, the term node refers to a peer. FIG. 1 summarizes the system's contributions to each layer of the blockchain architecture.

Transaction of a system, tx, is represented by a (prev, owner, cont, search_proof, h, σ) tuple, where prev is the hash value of a committed block to the blockchain. The prev pointer is used for each transaction tx to define an order of precedence between tx and all the blocks and transactions in the blockchain without the need of any synchronized clock. The block that is referred by prev takes precedence over tx. All the transactions included in the prev block are assumed to be committed before tx in the essence of time. By virtue of consequence, all the blocks and transactions that precede prev, also precede tx. The owner represents the identifier of the owner node in the Skip Graph overlay that generates the transaction tx. Equating the name ID and numerical ID of the peers with the hash value of their identity, owner refers to either of the name ID or numerical ID of the owner peer. The cont field of a transaction denotes the state transition of the assets of the owner node. The contribution is a general term that covers a vast variety of the blockchain applications that disclosed invention is applicable on. For example, in cryptocurrency applications, the state of peers corresponds to their wealth, and a transaction represents a monetary remittance between two peers. In such applications, cont includes the remittance value as well as the identifier of the receiver peer, to whom the transaction owner aims to transfer the fund. The search_proof field of a transaction is the authenticated proof of searches over the peers of the Skip Graph overlay to find the validators of the transaction tx, as explained before. The h field of the transaction tx is the hash value of the transaction, which is computed as shown by Equation 1 below. The σ field of the transaction tx contains the signatures of both the tx's owner as well the tx's validators on its hash value h. The owner's signature is for the sake of authenticity, and to prevent adversarial peers from masquerading as honest peers and submitting a transaction on behalf of them. The validators' signature is a part of the consensus strategy of the disclosed system, and is explained within the context of Proof-of-Validation consensus approach.

$$h=H(\text{prev}\|\text{owner}\|\text{cont}\|\text{search\_proof}) \quad (1)$$

A block in the system architecture, blk, is defined by a (prev, owner, S, search_proof, h, σ) tuple, which is similar to the transaction structure of the system except that S represents the set of all the transactions that are included in the block blk. The h field of block blk is its hash value, which is computed as shown by Equation 2 below. The σ field contains the signatures of both the blk's owner as well as blk's validators on its hash value (i.e., h).

$$h=H(\text{prev}\|\text{owner}\|S\|\text{search\_proof}) \quad (2)$$

Regarding the network layer, Skip Graph overlay of peers, transactions and blocks, disclosed invention represents each peer, transaction, and block by a Skip Graph node. This way, all the peers, transactions, and blocks are addressable within the network. In other words, participating nodes (i.e., peers) in the system exploit the Skip Graph overlay to search for each other, as well as each others' blocks and transactions. Both the numerical ID and name ID of the peers are the hash value of their identity (e.g., public key) using a cryptographic hash function. As in a Skip Graph, nodes' identifiers define the connectivity; hence, considering the hash function as a random oracle results in the uniform placement of peers in Skip Graph overlay, which limits the adversarial power on tweaking the Skip Graph topology for its advantage.

The numerical ID of a transaction or a block in the Skip Graph overlay is its hash value (i.e. h). The name ID of a transaction or a block is its corresponding prev field value. This regulation enables peers to traverse the system's ledger in both forward and backward directions. As a general policy in the disclosed invention, having a block with numerical ID (i.e., the hash value) of h and previous pointer value of prev, the (IP) address(es) of the peer(s) holding the immediate successor transaction(s) or block(s) in the blockchain are obtainable by performing a search for name ID of h over the Skip Graph overlay. This follows the fact that all the immediate successors of a block have h as their name ID. Similarly, since the prev pointer of a block or transaction is identical to the numerical ID of its previous block, the (IP) address of the peers that hold the immediate predecessor block are obtained by performing a search for numerical ID of prev in the Skip Graph overlay. This feature of the disclosed invention enables the peers to efficiently update their view towards the tail of the blockchain by performing a search for the name ID of their local state of the current tail. The search returns all the blocks that are appended subsequently to their local state of the current tail, as well as all the new validated transactions that are waiting to be included in blocks. Additionally, using this feature, a peer does not need to store the entire blockchain locally.

Rather, having only a single block of the ledger enables the peer to efficiently retrieve the predecessor and successor blocks to it.

Referring to FIG. 2, demonstration of the convention of present invention can be seen, where a peer that only has blk2 is able to efficiently retrieve its immediate predecessor (i.e., blk1) by searching for the numerical ID of its prev value (i.e., blk1.$h$=blk2.prev) in a fully decentralized manner. The search is responded by the owner of blk1 with its (IP) address, and hence the predecessor of blk2 (i.e., blk1) is retrievable efficiently by directly contacting its owner. Similarly, the peer that only possesses blk2 is able to perform a search for name ID over its hash value (i.e., blk2.$h$) to retrieve the immediate successor block that comes after blk2. As the result of the search for name ID of blk2.$h$, owner of blk3 responds to the search initiator peer with its (IP) address, and blk3 is retrievable efficiently by directly contacting its owner. In the case where a single block has several successor blocks, the search initiator receives a response from each of the immediate successor block's owners. In the example, considering blk4 as the current tail of the blockchain, the newly generated transactions that succeed blk4 (i.e., tx1, tx2, and tx3) are efficiently retrievable by performing a search for the name ID using blk4.$h$.

Regarding the consensus layer, Proof-of-Validation (PoV), fair, efficient, immutable and secure consensus is offered with the solution emanating from the disclosed invention. Proof-of-Validation (PoV), the consensus approach for the disclosed invention, is employed to validate the generated transactions and blocks. Once a transaction or block is validated by PoV, it is considered legitimate by all the participating peers. PoV is fair as each participating peer in the system has a uniform chance of being involved in the consensus regardless of its influence. PoV is efficient, as it requires only $O(\log n)$ communication complexity for validating a single transaction or block. PoV is immutable as none of the influential peers in reaching a consensus can legitimately change the consensus at a later time after it is finalized. Finally, PoV is secure as malicious peers are not able to generate a validated incorrect transaction or block. A transaction or block is considered as validated once it successfully passes the PoV consensus. Note that a validated transaction's contribution is not considered effective and authoritative unless it is included in a validated block that is committed to the blockchain. To validate each transaction or block, PoV provides a set of randomly chosen validators for the sake of evaluation as detailed in the followings.

Transaction generation and validation is handled as follows: PoV considers a transaction as valid if its hash value h is signed by t (randomly chosen) validators, where t is a constant protocol parameter, which is called the "Signatures Threshold". For a transaction tx, the numerical ID of each validator is chosen uniformly as shown by Equation 3 below, where vi is the numerical ID of the $i^{th}$ validator in the Skip Graph overlay. To prevent adversarial transaction owners from brute-forcing i to draw other adversarial peers' numerical ID as their generated transaction's validators, system only allows a transaction's owner to iterate i over $[1,\alpha]$, where $\alpha$ is another constant protocol parameter, which is called the "Validators Threshold". Later on, formulation for deciding on the proper values of the "Signatures Threshold" and "Validators Threshold" considering the security, efficiency, and availability of system are ascertained.

$$vi = H(\text{tx.prev} \| \text{tx.owner} \| \text{tx.cont} \| i) \quad (3)$$

The transaction's owner then conducts a search for numerical ID of the validator (i.e., vi) within the Skip Graph overlay. If there exists a peer with the numerical ID of vi in the overlay, the owner receives its IP address. Otherwise, it receives the IP address of the peer with the largest available numerical ID that is less than vi. Both cases are supported with an authenticated search proof that is generated by the Skip Graph peers on the search path, and is delivered to the owner. The authenticated proof of the search for numerical ID of the $i^{th}$ validator is denoted by search_proof, which also contains all the IP addresses and identifiers of the Skip Graph peers on the search path. The last peer on the search path of vi is designated as the $i^{th}$ validator. The tx's owner then adds the authenticated search proof for all the validators to the transaction, computes its hash value h as specified by Equation 1, signs the hash value, and appends her signature to σ. The tx's owner then contacts the validator asking for the validation of the ix. During the validation, the validators evaluate the soundness, correctness, and authenticity of tx, as well as the balance compliance of ix's owner to cover the fees. As the validation result for tx, the transaction owner either receives a signature over h or null from each contacted validator.

Soundness is an evaluational measure of following criteria: A transaction tx is said to be sound if prev points to the hash value of a validated and committed block with no transaction of the tx's owner in any of the subsequent blocks. In other words, the newly generated ix transaction should succeed all of the previously registered transactions of its owner on the blockchain. This is both to counter double-spending from the same set of assets, as well as to make the validation of a transaction a one-time operation, i.e., the owner of a validated Lx transaction is able to append it to the blockchain as long as it does not generate any transaction on the blockchain that precedes tx based on prev. Additionally, by establishing the soundness, no transaction generator has more than a single transaction inclusion chance in each new block. Once one of her transactions is included in a block, the other transactions of the same owner become unsound and cannot be included in the same block. Therefore, soundness provides a uniform chance for the transaction generators to include their transaction into each new block.

Correctness is an evaluational measure of following definition: For a transaction tx to be correct, its contribution field (i.e., cont) should represent a valid state transition of the owner's assets. The compliance metric is application dependent. For example, in cryptocurrency applications, for a transaction to be correct, the owner's account should have enough balance to cover the remittance fee (i.e., the contribution).

Authenticity is described as follows: The evaluation of authenticity is done by checking the correctness of h based on Equation 1, verifying σ for the inclusion of a valid signature of tx's owner over h, and verifying search_proof for all the validators of tx. The validator rejects the validation of tx as unauthenticated if any of these conditions is not satisfied.

Balance Compliance is defined as follows: As an incentive mechanism to participate in the validation, system of the disclosed invention considers a validation fee in the favor of the t validators of the transaction tx that sign its hash value and make it validated. Also, system considers a routing fee in the favor of all the Skip Graph peers that participate in finding the tx's validators, i.e., the peers that their identifiers are included on the search path of every validator according to the search_proof, excluding the validator and the owner itself. A transaction tx passes the balance compliance part of validation if tx's owner has enough balance to cover the validation and routing fees. The balance compliance validation is done based on the view of the validator towards the blockchain. Both the routing and validation fees are fixed-value protocol parameters, and are the incentive mechanism for the peers to perform the routing and validation honestly. The fees also prevent Sybil adversarial peers on indefinitely generating transactions by circulating the adversarial balance among themselves and continuously congesting the system with the validation of adversarial transactions; where the term Sybil attack denotes the attack where an adversary aims on subverting the blockchain system by adding many forged peers to the system all under the control of the same adversary.

If tx is sound, correct, authenticated, and tx's owner has a balance compliance to cover the fees, the validator signs tx.h, and sends the signature to tx's owner, who then includes the validator's signature inside tx.a. For a transaction tx to be considered as validated, PoV requires the owner to include t valid signatures issued by the validators in the tx.search_proof. The validated tx transaction is inserted as a Skip Graph node by its owner, which makes it accessible by other participating peers of the system to be included in a block. The numerical ID of tx is tx.h, and the name ID of tx is tx.prev, which enables any Skip Graph peer to conduct a search for name ID on the hash value of any ledger's block within the Skip Graph overlay and find all the new transactions that are pointing back to that block.

Regarding block generation and validation; a peer that generates blocks is called a block owner. Once a block owner collects at least min_tx newly generated transactions that have not been included into any validated block that has been committed to the blockchain, it casts them into a new block blk, and sends the block for validation. By casting transactions into blk it is meant that including the collected transactions into blk.S set as discussed earlier. min_tx is an application-dependent fixed-value parameter of the system of the disclosed invention denoting the minimum number of the transactions that should be included in a block. In contrast to the transaction owners that have more flexibility on choosing their transaction's prev pointer, the block owners should always set the prev pointer of their block to the current tail of the blockchain. Similar to the transactions, in PoV a block blk is validated if its hash value (i.e., blk.h) is being signed by t randomly chosen PoV validators. To have blk validated, the block owner computes the numerical ID of the ith validator as shown by Equation 4 below:

$$vi = H(blk.prev \| blk.owner \| blk.S \| i) \quad (4)$$

Similar to the transaction validation discussed earlier, the block owner searches for validators in the Skip Graph overlay, and completes the structure of blk by including the search_proof for valdiators into search_proof, computing b/k's hash value (i.e., blk.h), and including its own signature over blk.h into blk.σ. The block owner then contacts each of the validators and asks for the validation. Consistent with the transaction validation, a block owner is only allowed to iterate over Equation 4 for i∈[1, α]. As the validation result for blk, the block owner either receives a signature over blk.h or null from each contacted validator. If the block owner receives t signatures over blk.h from its PoV validators, it is said that the block passed the PoV validation. On receiving a validation request for a block blk, each of its PoV validators checks the authenticity and consistency of blk itself, the balance compliance of its owner, as well as the authenticity and soundness of all transactions included in blk.S (as discussed earlier). The authenticity evaluation of blocks is done similar to the transactions.

Consistency: A block blk is said to be consistent, if its blk.prev pointer points to the current tail of the blockchain; otherwise it is inconsistent. The current tail of the blockchain is the most recent view of the validators towards the tail of the chain. Inconsistencies among validators' views are handled by the proposed fork-free mechanism in the disclosed invention, which will be elaborated hereinafter.

Balance Compliance: The balance compliance of a block owner is evaluated similarly to the transaction owners, except that in addition to the deduction of the routing and validation fees, the remaining balance of the owner is updated by adding a block generation reward. The block generation reward is a fixed-value parameter of the system that acts both as an incentive mechanism for encouraging the peers to participate progressively in generating blocks, as well as a mean for wealth creation.

If blk's structure is authenticated, consistent, blk's owner has a balance compliance to cover the fees, and all the transactions in blk.S are sound and authenticated, the validator signs blk.h, and sends the signature to blk's owner, who includes the validator's signature inside blk.σ. PoV considers a block blk as validated if blk.σ field contains t valid signatures on blk.h value. Valid signatures are the signatures issued by the validators that are denoted in the blk.search_proof. After the blk gets validated, its owner inserts it into the Skip Graph overlay as a node. Numerical ID of blk is blk.h, and its name ID is blk.prev, i.e. the hash value of its immediate predecessor block on the blockchain. Similar to the transactions, this approach of the disclosed invention on the name ID and numerical ID of blocks makes the entire blockchain ledger traversable in both forward and backward directions by searching for the name ID and numerical ID of the blocks within the Skip Graph overlay, respectively.

Figure 3:
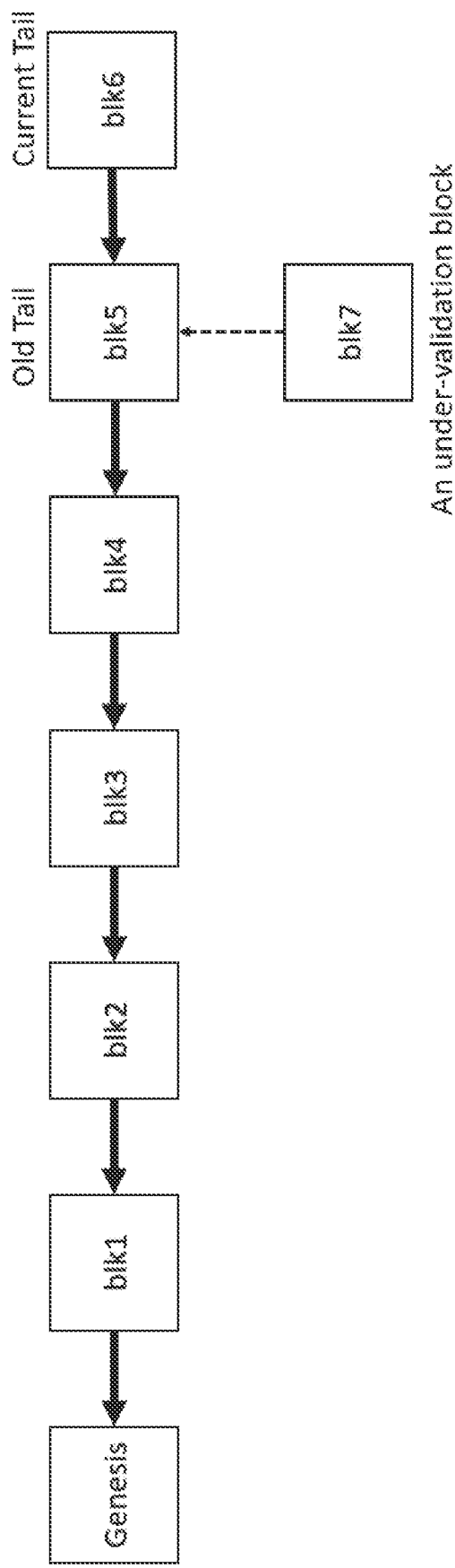
FIG. 3 demonstrates the example case of a potential fork in the blockchain architecture according to the disclosed invention.

It is likely for the current tail of the blockchain to be updated during the validation of a newly generated block. Although randomly chosen PoV validators of a block evaluate its consistency during the validation phase, nevertheless, the update on the current tail of the blockchain makes the block inconsistent during the validation procedure. Validating such an inconsistent block emerges a fork on the blockchain. To tackle this problem, once any of the randomly chosen PoV validators detects a potential fork at any step of the validation, it terminates the validation with a rejection, informing the owner. A potential fork is the situation where another block outpaces an under-validation block and becomes the new tail of the blockchain. This implies that the validators of a block need to keep their view of the blockchain's tail updated by continuously performing a search for the name ID of the hash value of the current tail, which returns all the blocks and transactions that immediately succeed the tail. In this manner, upon any update on the current tail, the new tail is returned as the result of the search. A potential fork example is illustrated by FIG. 3 where block seven, blk7, is undergoing the final validation but its validation is terminated with rejection when any of its randomly chosen PoV validators detects that another block (i.e., blk6) has outpaced blk7 in validation and became the new tail block of the blockchain.

Figure 4:
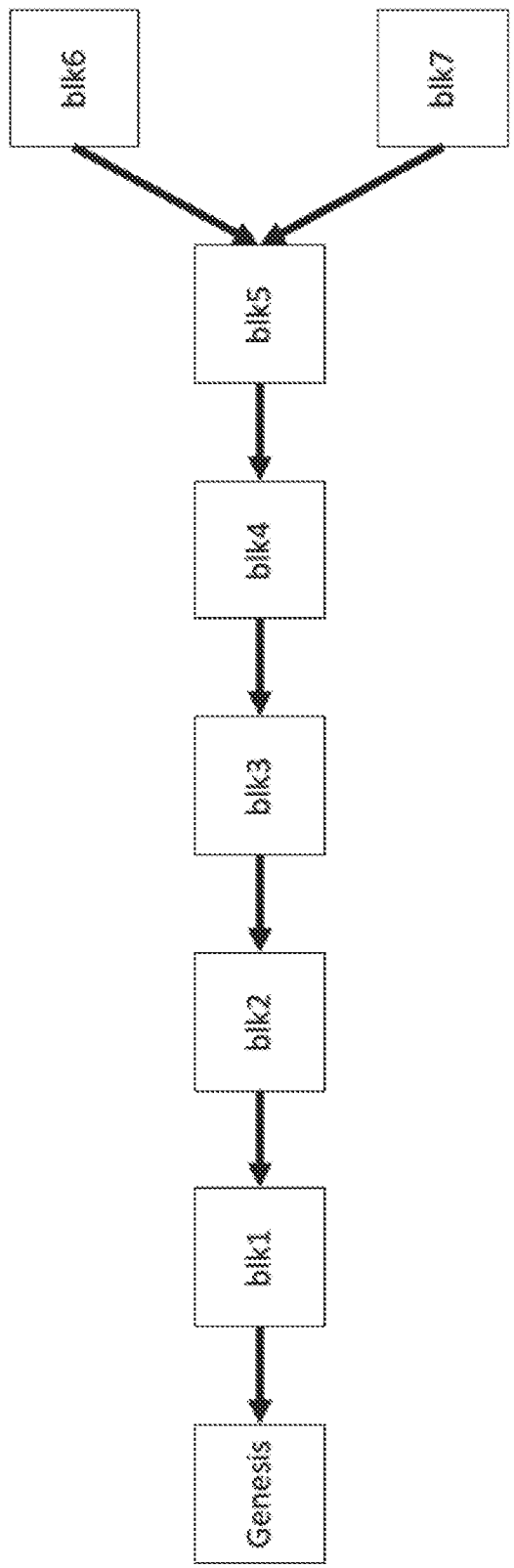
FIG. 4 demonstrates the fork-free mechanism, or fork resolving strategy of the blockchain where simultaneous validation is settled with regards to the lowest hash value according to the disclosed invention.

Fork-free mechanism as a property of the architecture of the disclosed invention is elaborated as follows: To resolve the forks caused by the simultaneously validated blocks, system governs a fork-free mechanism, which is a deterministic approach that instructs all the peers to solely follow the block with the lowest hash value upon a fork. For example, in the snapshot of FIG. 4 in the fork that is caused by simultaneous validations of the blocks blk6 and blk7 by disjoint set of PoV validators, whichever of blk6 or blk7 that has the lowest hash value is presumed as the one committed to the blockchain, and is followed by all the peers of the system. Upon a fork, the block with the lowest hash value is regarded as the winner block, and the other participating blocks of the fork are regarded as the knocked-out ones. The knocked-out block owners remove their block from the Skip Graph overlay, update their set of transactions by dropping the transactions that are included in the winner block, adding the new transactions to reach the min_tx threshold, and restart the validation procedure. The knocked-out block owners neither gain any block generation reward nor lose any balance because of the fees, as these fees and rewards are not effective unless the block is successfully committed to the blockchain, i.e. the block passes the PoV validation, wins the possible forks, and is appended to the current tail of the blockchain. Once a block blk is committed to the blockchain, the contributions and fees of transactions in blk.S, as well as the fees and rewards associated with blk itself become effective.

The storage layer: randomized replication for better efficiency and availability resulting from the architecture of the disclosed invention is ensured in that, in the system, each transaction or block is stored in the local storage of its associated owner, and presented as a Skip Graph node, which makes it efficiently searchable by all the participating peers in the system. Hence, peers do not need to store or download the entire blockchain. Rather, they access the transactions and blocks in an on-demand manner i.e. a peer searches for a transaction or block upon a need and retrieves it efficiently from the overlay. This is done with the exception that a transaction owner should remove its transaction from the overlay once it is included in a committed block, to be discarded from the list of transactions that are waiting to be placed into the blocks. We assume the peers in the system are subject to churn i.e., volatile between online and offline states in a timely fashion. To provide availability of the transactions and blocks under churn, in the system all the randomly chosen PoV validators of a transaction or block also act as its corresponding replicas by storing a copy of it in their local storage, representing it as a node in the overlay, and being responsive to the other peers queries over it.

Referring to the view layer features of randomized bootstrapping, a trusted and consistent view synchronization; view of a peer in the system of the disclosed invention is a table of (numID, lastblk, state, balance) tuples. Each view table entry represents a single peer of the system with the numerical ID of numID, the current state of assets that is determined by the state, and the remaining balance of balance. The lastblk represents the hash value of the last block on the blockchain that contains the most recent transaction of that peer. We define the view introducers of a new peer as the set of randomly chosen overlay peers that share their view of the blockchain with a newly joined peer. Upon joining the overlay, a new peer computes the numerical IDs of its view introducers based on Equation 5 as seen below where new_peer.numID is the numerical ID of the new peer and view_intro$_i$ is the numerical ID of the $i^{th}$ view introducer of it.

The random oracle hash function (i.e. H) is employed to obtain uniformly random view introducers' numerical IDs. The new peer then conducts a search for numerical ID of view_intro$_i$ within the overlay, contacts the peer in the search result, and obtains its view of the blockchain. The new peer continues in this manner by iterating over i until it obtains t consistent views. Although, in contrast to the PoV, brute-forcing over i is not a security concern, nevertheless, as it will be shown later, α is determined in such a way that a new peer obtains t consistent views by iterating i over [1, α]. Moreover, we determine the t in such a way that a new peer obtains t consistent views of the honest peers by iterating i over [1, α].

$$\text{view\_intro}_i = H(\text{new\_peer.numID} \| i) \qquad (5)$$

Motivating honest behavior and misbehavior detection is employed as follows: In addition to the block generation rewards, and the routing and validation fees, each peer of the system acts as an auditor for other peers and gains rewards by reporting their misbehavior in the disclosed invention. Misbehavior refers to any sort of deviation from the described protocol and architecture. As an auditor, any peer should be able to evaluate a block or transaction in the same way that its PoV validators do during the validation. Any deviation from the architecture's protocol that causes the re-validation to fail for the auditor is considered as misbehavior e.g. the invalid signature of validators, missing the threshold of t signatures on the hash value, and validating an invalid block or transaction. Validating an invalid block or transaction happens when an adversarial transaction or block owner finds t randomly chosen malicious PoV validators who deviate from the validation protocol and sign an invalid block or transaction e.g. a double-spending transaction. However, as discussed later in this paper, t is chosen in a way that finding t number of randomly chosen malicious PoV validators happens with a negligible probability in the system's security parameter.

Upon misbehavior detection, the auditor generates a transaction with the evidence of the misbehavior in the contribution field. The transaction then goes through the same PoV validation process as described earlier, except that the validators verify the correctness of the transaction as the correctness of the reported evidence. Once the transaction is validated and placed into a committed block to the blockchain, the guilty peer is penalized by the misbehavior penalty fee, routing fee, and validation fee that it is made to pay to the owner (i.e. auditor), routers, and validators of the transaction, respectively. Misbehavior fee is another constant parameter of the system that is application dependent. Once misbehavior is recorded for a peer on a committed block, its identifier is blacklisted. The blacklisted peers are isolated by honest peers i.e. any incoming message from the blacklisted peers is discarded by honest peers. This eventually results in the blacklisted peers being excluded from the overlay, which causes the blacklisted peers to never being selected as a validator as they no longer are a part of the overlay from the honest peers' point of view. A blacklisted peer appearing in an authenticated search proof implies a malicious router peer on the search path that is caught and blacklisted accordingly.

Direct retrieval of the latest state in the architecture is the case where each block contains the latest state of assets sources that are updated by the transactions. In addition to be represented by a Skip Graph node as explained, each block is cached by several pointers for direct retrievability of the latest state of its associated assets. Pointer(s) are Skip Graph node(s) with the name ID of the assets' owner, and the numerical ID of the hash value of the block. For example, in cryptocurrency applications where each transaction of a block represents an update in the balance of the transaction sender (i.e., owner) as well as the receiver, each block is represented with twice as many as pointers as the number of its transactions i.e., one for the sender of the transaction, and the other one for the receiver. The numerical ID of all pointers corresponds to the hash value of the block. The name ID of each pointer node corresponds to the identity of peer that is associated with the pointer e.g., public key of the sender or receiver. In this manner, a peer that is solely interested in knowing the latest assets state of another peer, performs a search by name ID within the Skip Graph overlay with the identifier of the other peer as the search target and obtains a pointer node to its latest state. The numerical ID of the obtained pointer node corresponds to the hash value (i.e. numerical ID) of the block that contains the most recent transaction on the associated assets state of the peer of interest. Thus, by performing a search for the numerical ID of the associated hash value, the block that contains the most recent assets state of the peer of interest is retrieved. The pointers associated with each block are inserted by its owner and are replicated on the set of randomly chosen PoV validators as Skip Graph nodes. However, both the owner and validators should take down the pointers of each asset once an update on that asset is happened in a newer committed block to the blockchain. Taking down a pointer node from the overlay is simply done by performing the Skip Graph node deletion operation by the owner and each of the validators in a fully decentralized manner. This is for the sake of better efficiency of the search, and to make sure that the pointers always point to the most recent states. Not dropping the pointers after a new update is counted as misbehavior, and is subject to a penalty. To address the network asynchrony, however, the block owner and PoV validators are allowed to take down the pointers within at most a certain number committed blocks after a new transaction on the associated set of assets. This allows them to have enough time to discover the new updates without being penalized. The length of the block interval (i.e. number of blocks between two pointers) is a protocol constant parameter that is application dependent.

In a nutshell, disclosed invention relates to a blockchain architecture that operates over a Skip Graph-based P2P overlay to improve the communication and storage efficiency, convergence to centralization, and consistency problems of the existing blockchain solutions. In contrast to the existing blockchains that operate on epidemic data dissemination, disclosed invention provides addressable peers, blocks, and transactions within the network, which makes them efficiently accessible in an on-demand manner by all the peers using the Skip Graph lookup operation. Using this architecture, no peer is required to store the entire blockchain. Rather each peer stores a replicated subset of the blocks and transactions and answers other peer's queries on those blocks and transactions. Disclosed invention proposes a fair blockchain as it considers a uniform chance for all the participating peers to be involved in the consensus protocol regardless of their influence in the system (e.g., hashing power, stakes, etc). To improve the consistency of the blockchain, the system governs a deterministic fork-resolving policy.

According to one embodiment of the present invention, an append-only distributed database system for blockchain transactions, cryptocurrency and internet-of-things comprising at least one peer that generates blocks and transactions is proposed.

In one aspect of the present invention, said system further comprises a fair consensus layer with proof-of-validation scheme using a uniform involvement probability for each participating peer.

In another aspect of the present invention, said system further comprises a bandwidth efficient network layer with a distributed hash table based, structured peer-to-peer topology.

In another aspect of the present invention, said system further comprises a view layer with randomized bootstrapping.

In another aspect of the present invention, said system further comprises a storage layer with randomized replication.

In another aspect of the present invention, said distributed hash table based structured peer-to-peer topology is a skip graph.

In another aspect of the present invention, said distributed hash table skip graph is configured to represent blocks as nodes.

In another aspect of the present invention, each of said peers are configured to keep a subset of a portion of blocks and transactions.

In another aspect of the present invention, said portion of blocks and transactions are chosen uniformly at random.

In another aspect of the present invention, at least one copy of each of the blocks and transactions are configured to be accessible at any time.

In another aspect of the present invention, said architecture is further configured to have a fork-free ledger structure.

In one aspect of the present invention, a fork resolution method for consensus forming in distributed database systems and architectures such as blockchain is proposed.

In another aspect of the present invention, said method comprises the step of fork winning, wherein among a plurality of simultaneously validated blocks, the block with the lowest hash value is assumed appended to the chain;

In another aspect of the present invention, said method comprises the step of block discarding, wherein blocks not having the lowest hash value and any other participating block appended thereto are marked discarded.

In another aspect of the present invention, said method comprises the step of overlay removal, wherein owners of the discarded blocks remove said block from the overlay or discard the accessibility of other nodes to their discarded block.

In another aspect of the present invention, said method comprises the step of fork following, wherein every participating peer is instructed to follow the block with the lowest hash value.

What is claimed is:
1. An append-only distributed database system for blockchain transactions, cryptocurrency and internet-of-things, comprising at least one peer generating blocks of a blockchain and transactions, wherein
the append-only distributed database system further comprises a fair consensus layer with a proof-of-validation scheme using a uniform involvement probability for each participating peer; and
the append-only distributed database system further comprises a bandwidth efficient network layer with a distributed hash table based structured peer-to-peer topology, wherein the distributed hash table based structured peer-to-peer topology is a skip graph, and wherein the skip graph is configured to represent the blocks of the blockchain as nodes of the skip graph.

2. The append-only distributed database system according to claim 1, further comprising a view layer with a randomized bootstrapping.

3. The append-only distributed database system according to claim 2, wherein each participating peer is configured to keep a subset of a portion of the blocks and transactions.

4. The append-only distributed database system according to claim 2, wherein an architecture is configured to have a fork-free ledger structure.

5. The append-only distributed database system according to claim 1, further comprising a storage layer with a randomized replication.

6. The append-only distributed database system according to claim 5, wherein each participating peer is configured to keep a subset of a portion of the blocks and transactions.

7. The append-only distributed database system according to claim 5, wherein an architecture is configured to have a fork-free ledger structure.

8. The append-only distributed database system according to claim 1, wherein each participating peer is configured to keep a subset of a portion of the blocks and transactions.

9. The append-only distributed database system according to claim 8, wherein the portion of the blocks and transactions are chosen uniformly at random.

10. The append-only distributed database system according to claim 9, wherein at least one copy of each of the blocks and transactions are configured to be accessible at any time.

11. The append-only distributed database system according to claim 8, wherein at least one copy of each of the blocks and transactions are configured to be accessible at any time.

12. The append-only distributed database system according to claim 8, wherein an architecture is configured to have a fork-free ledger structure.

13. The append-only distributed database system according to claim 1, wherein an architecture is configured to have a fork-free ledger structure.

14. The append-only distributed database system according to claim 1, wherein the nodes of the skip graph representing the blocks of the blockchain are different from any nodes of the skip graph that represent peers.

* * * * *